Nov. 23, 1965    J. P. SCHNEEBELI    3,219,170
INVERTING APPARATUS
Filed March 13, 1964    2 Sheets-Sheet 1

INVENTOR
JEAN P. SCHNEEBELI

BY Hans G. Hoffmeister
ATTORNEY

Nov. 23, 1965  J. P. SCHNEEBELI  3,219,170
INVERTING APPARATUS
Filed March 13, 1964  2 Sheets-Sheet 2
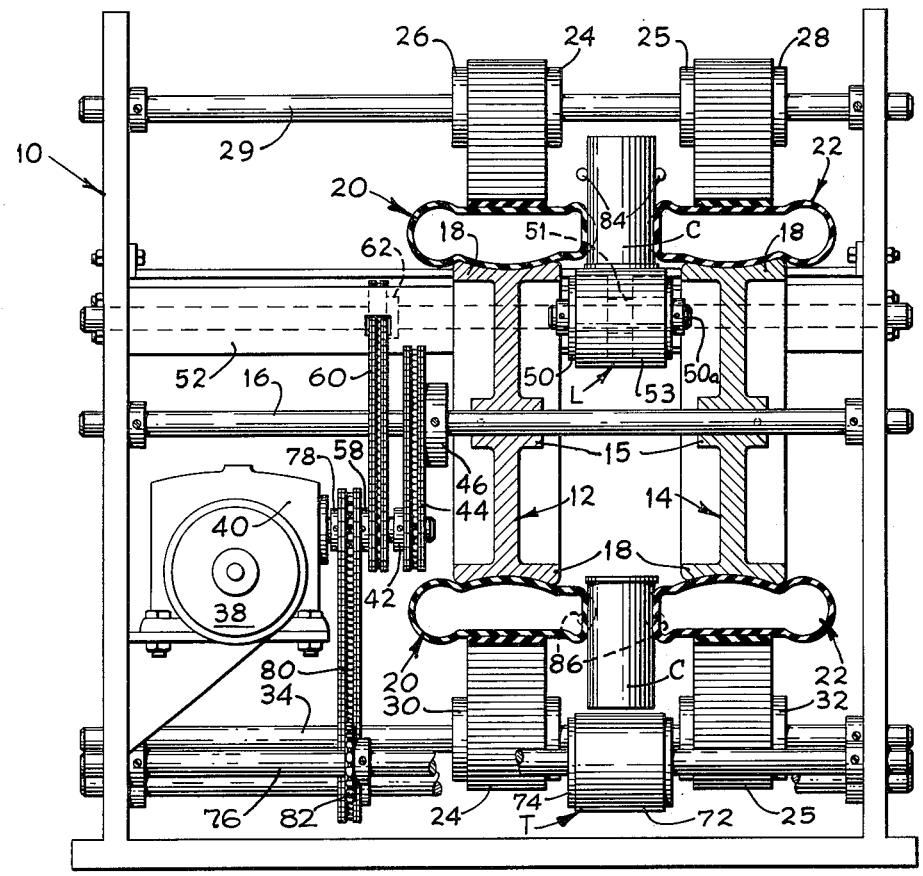
FIG_2
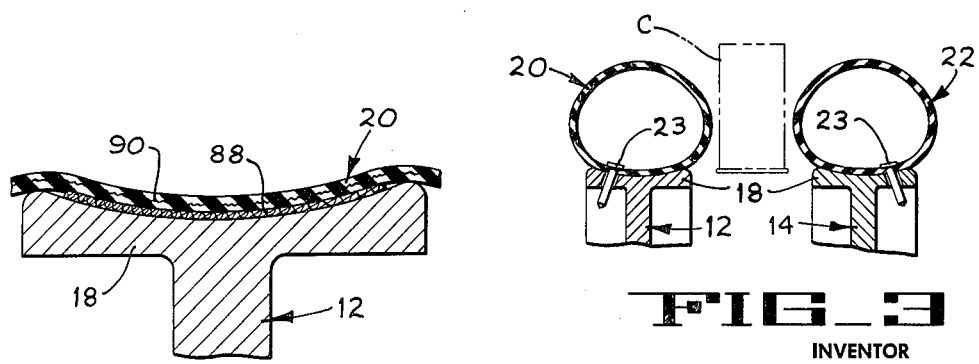
FIG_4
FIG_3
INVENTOR
JEAN P. SCHNEEBELI
BY *Hans G. Hoffmeister*
ATTORNEY

(Patent text, columns 1 and 2)

United States Patent Office 3,219,170
Patented Nov. 23, 1965

3,219,170
INVERTING APPARATUS
Jean P. Schneebeli, Santa Clara, Calif., assignor to FMC Corporation, San Jose, Calif., a corporation of Delaware
Filed Mar. 13, 1964, Ser. No. 351,670
4 Claims. (Cl. 198—33)

This invention relates to material handling apparatus and more particularly to apparatus for inverting a continuous line of moving articles and depositing them on a take away conveyor. In production lines in the food industry, breweries, etc., it is at times necessary during the preparation of filled and sealed containers to invert successively the containers that are moving continuously in a line, and to deposit the containers in their inverted condition on a take away conveyor.

For example, in breweries where canned beer is being packaged, the beer cans may be inverted as many as four times along the production line. The open ended cans, to which the tops have not been applied, may be carried along a line upside down for rinsing, whereupon they may be inverted for filling. After filling, the lid will be applied and the cans pasteurized. Before pasteurizing, the cans may be inverted to test for leakage from the lid, whereupon the cans may be inverted a fourth time, to bring them right side up for packaging. Many beer cans are now made of thin aluminum sheet, and are quite fragile, as are paper food containers and the like. Thus the mechanism which grips and inverts these articles must handle the articles gently.

It is an object of the present invention to continuously invert a moving row of articles and deposit them in an inverted position on a take away conveyor.

Another object of the invention is to make possible gentle, damage free inversion of fragile articles, such as open ended aluminum beer cans, paper containers, or the like.

A further object of the invention is to provide an inverting apparatus that makes possible selection of the gripping force exerted against the articles, during their inversion.

Another object of the invention is to provide an inverting apparatus of the type described, which is exceedingly economical in construction and is of simple design.

Still another object is to provide an inverting apparatus which will not damage fragile articles, and which includes a pair of inverting wheels that can be mounted on a common shaft.

The manner in which these and other objects of the present invention may be attained will be appparent to those skilled in the art from the following detailed description of the invention. The apparatus to be described in detail, is designed and proportioned for the inversion of articles such as beer cans in a continuous line.

In the drawings:
FIGURE 1 is a side-elevation of an inverting apparatus embodying the invention, with part of the frame broken away.
FIGURE 2 is an end elevation of the apparatus, with the inverting wheels sectioned in the vertical plane, to show their gripping action.
FIGURE 3 is a fragmentary section taken through the inverting wheels and gripping tubes, with the latter in their undeformed condition.
FIGURE 4 is a fragmentary enlarged section showing modified constructions of the gripping pneumatic tubes employed in the invention.

Referring to FIGS. 1 and 2, the apparatus has a frame indicated generally at 10, with the side-wall of the frame being broken away in FIG. 1.

The apparatus includes an article delivery conveyor D (FIG. 1), a lead-in conveyor L, and a take away conveyor T, for the inverted articles. The lead-in conveyor L is a continuation of the delivery conveyor D, and may also be considered to be a delivery conveyor.

Mounted within the frame are inverting wheels 12 and 14, which are axially spaced, and are mounted for rotation on a common shaft in the vertical plane. These wheels are identical, and only one will be described in detail. Each wheel has a hub 15, mounted on a drive shaft 16 that is journaled in the side walls of the frame 10. The wheels are formed with tube mounting rims 18, having concave outer surfaces. A pneumatic article gripper tube 20 is mounted on wheel 12, and an identical tube 22 is mounted on the inverting wheel 14. Each tube has an inflation valve 23 of conventional construction, accessible through the rim of the mounting wheel of the associated inverting wheel.

The tubes 20 and 22 resemble, and in fact may be supplied from, a stock of inner tubes for small vehicles such as compact cars, motor scooters, and the like. In the form of the invention illustrated in the drawings, a conventional inner tube that fits a rim having a diameter in the order of 10 to 13 inches is disclosed. The inner tube is formed of an elastomeric material such as natural rubber, or synthetic rubber such as GR–S but, preferably it is formed of a butyl type synthetic rubber because of the low permeability of this rubber to the diffusion of air over long periods of time. The tubes 20, 22 are inflated to the desired air pressure through the conventional inflating valves 23. The inflation pressure is low, it may be less than one p.s.i., and is determined by the weight and velocity of the articles being inverted. Another elastomeric material suitable for the tubes 20, 22 is plasticized polyvinyl chloride and co-polymers thereof.

In order to radially flatten the pneumatic tubes and cause their sides to spread laterally for gripping the articles to be inverted, an endless band 24, 25 is provided for each tube 20, 22, respectively. These bands are of identical construction, and are formed of rubberized or rubber coated square woven fabric, so that they are relatively inextensible and yet are quite flexible. The bands 24, 25 are narrower than the lateral sectional diameter of the tubes 20, 22 when the tubes are inflated. As illustrated in FIG. 2, these bands are also somewhat narrower than the lateral dimension of the rim portions 18 of the inverting wheels, but this dimension is not critical.

The bands 24, 25 are trained over upper pulleys 26, 28 and lower pulleys 30, 32. These pulleys are disposed, as best seen in FIG. 1, so that each band is trained circumferentially about the portion of its associated pneumatic tube that extends circumferentially from the delivery end of the article lead-in conveyor L, to the article receiving end of the article take away conveyor T. The pulleys 26, 28 are mounted on shafts 29, which are journaled in the side plates of the frame 10. The lower band pulleys 30, 32 are mounted on a shaft 34 which is mounted in the same manner.

The inverting wheel shaft 16 is driven by a motor 38, a gear box 40, a drive sprocket 42, a chain 44, and a driven sprocket 46 on the shaft 16.

As mentioned, the apparatus includes an article delivery conveyor D, a lead-in conveyor L, and an article take away conveyor T. An idler roller 50 at the article delivery end of the lead-in conveyor L, is positioned in a vertical plane y—y through the shaft 16 of the inverting wheels 12 and 14. As seen in FIG. 2, the idler roller 50 is split, and its shaft 50a is supported by a cantilever arm 51, projecting from a frame cross piece 52. The conveyor L includes a rubberized or rubber covered fabric belt 53 of conventional design, and a drive roller 54 mounted on a shaft 56 at the receiving end of the conveyor. A drive sprocket 58 (FIG. 2) is also driven from the gear box 40, and drives a chain 60 which is trained around the driven sprocket 62 for the conveyor roller shaft 56.

The delivery conveyor D has its belt 64 trained about a roller 66, the upper reach of the belt being supported on a plate 67. The disposition of the upstream end of the conveyor which is driven, is not critical to the invention, and hence is not shown.

The article take away conveyor T has a belt 72, supported on a plate 73 and a drive roller 74 on a shaft 76. The roller 74 is driven by a sprocket 78 on the same shaft as sprocket 58 (FIG. 2), a chain 80, and a sprocket 82 on the roller shaft 76.

The drive roller 74 at the article receiving end of the take away conveyor T need not have its axis positioned in the vertical plane y—y that contains the axis of shaft 16, for the inverting wheels, and the shaft 50a for the split roller 50 of the conveyor L. The drive roller 74 for the take away conveyor T is preferably positioned to the right of the plane y—y, as it is viewed in FIG. 1 of the drawings. Guide rails 84 for the conveyors D and L, and 86 for the conveyor T are provided.

As seen in FIG. 3, when the pneumatic tubes 20, 22 are undeformed, their inner or opposing sides are positioned so that they just clear the articles being handled, such as cans C. The cans C, which have previously been positioned by guide rails 84, enter between the tubes 20, 22 adjacent the downstream or delivery end of the lead-in conveyor L, without interference. Similarly, the cans C when released to the upper reach of the take away conveyor T, are freed by the tubes 20, 22, and are directed between the pair of guide rails 86 for continuing down the line of the take away conveyor.

The operation of the device should be apparent from the above detailed description thereof, but will be reviewed briefly. As cans C are moved along the upper reach of the lead-in delivery conveyor L, they enter between the unflattened portions of the inverting tubes 20, 22, whereupon they are gradually and progressively gripped by the radially flattened, laterally shifted inside portions thereof, as clearly shown in FIG. 2. This gripping is caused by the action of the bands 24, 25 and the inflation of the pneumatic tubes. The cans are next supported solely by the lateral deformation of the inner or opposed side walls of tubes 20, 22 and are carried circularly around by the inverting wheels 12, 14 (FIG. 1) until they have reached the delivery end of the upper reach of the take away conveyor T. Here they are quickly released by the restoration of the cross-sectional shape of the tubes 20, 22 to their normal conditions, as illustrated in FIG. 3. Thus the can, now inverted, proceeds along the take away conveyor T.

The system of the present invention, for example, can handle 20 cans per second. With cans that are approximately 3 inches in diameter, this represents a linear velocity of the conveyors D, L and T of about 300 feet/min. The drive for the inverting wheels 20, 22 as determined by the gear box 40, is adjusted so that the linear speed of the rims 18 of the inverting wheels, is approximately equal to the linear speed of the conveyors.

Although it is contemplated that ordinary passenger car, or large section motor scooter type inner tubs can be employed for use as tubes 20, 22 of the present invention, refinements in tube design are possible for heavy duty service. As seen in FIG. 4, it may be desirable to cement or vulcanize a band 88 of square woven fabric to the inner periphery of the tube which seats on the wheel rim 18. The tubes can be attached to the rims 18 with either a vulcanizing or a non-vulcanizing rubber cement.

Also, in some services the tubes may be reinforced by one, or preferably two, very light flexible plies 90, of square woven material laid on the bias during the building of the tube, before curing thereof in the usual mold.

As is known, in the art, tubes of this type are usually made in cylindrical form, and the ends are brought together and they are given their final shape by inflation of the tubes while they are confined in a toroidal mold.

In the case of relatively sturdy articles, the tubes 20, 22 can be formed with more or heavier bias laid plies 90, so that the tubes hold their shape without inflation. The bands 24, 25 still flatten the tubes and cause them to grip the cans or other articles.

Having completed the detailed description of the invention so that those skilled in the art may practice the same, I claim:

1. An article inverting apparatus comprising a pair of axially spaced, axially aligned invertor wheels mounted for rotation in the vertical plane, a thin walled, flexible tube formed of elastomeric material mounted on each wheel, a delivery conveyor for delivering articles between the upper portions of said tubes, the delivery reach of said delivery conveyor terminating in a vertical plane through the axes of said wheels, a take away conveyor running oppositely to said delivery conveyor below said tubes, an endless band for each tube, and means for training each band circumferentially about the portion of the associated tube that extends from the delivery end of said delivery conveyor to the receiving end of said take away conveyor, said bands radially flattening said tubes for causing the sides thereof to spread laterally and resiliently grip articles delivered by said delivery conveyor.

2. An article inverting apparatus comprising a pair of axially spaced, axially aligned invertor wheels mounted for rotation in the vertical plane, a thin walled, flexible, lightly inflated pneumatic tube formed of elastomeric material mounted on each wheel, a delivery conveyor for delivering articles between the upper portions of said pneumatic tubes, the delivery reach of said delivery conveyor terminating in a vertical plane through the axes of said wheels, a take away conveyor running oppositely to said delivery conveyor below said pneumatic tubes, an endless band for each pneumatic tube, and means for training each band circumferentially about the portion of the associated tube that extends from the delivery end of said delivery conveyor to the receiving end of said take away conveyor, said bands radially flattening said tubes for causing the sides thereof to spread laterally and resiliently grip articles delivered by said delivery conveyor.

3. The apparatus of claim 2, wherein the opposed sides of the unflattened circumferential portion of said tubes have a spacing that is not less than the width of an article to be inverted.

4. An article inverting apparatus comprising a pair of axially spaced, axially aligned invertor wheels mounted for rotation in the vertical plane, a thin walled, flexible, lightly inflated pneumatic inner tube mounted on each wheel, a delivery conveyor for delivering articles between the upper portions of said pneumatic tubes, the delivery reach of said delivery conveyor terminating in a vertical plane through the axis of said wheels, a take away conveyor running oppositely to said delivery conveyor below said pneumatic tubes, an endless band for each pneumatic tube, and generally vertically aligned pulleys above and below each tube and upstream of the delivery end of said delivery conveyor for training each band circumferentially about the portion of the associated tube that extends from the delivery end of said delivery conveyor to the receiving end of said take away conveyor, said bands radially flattening said tubes for causing the sides thereof to spread laterally and resiliently grip articles delivered by said delivery conveyor.

References Cited by the Examiner

UNITED STATES PATENTS 2,879,882    3/1959    Whelan _____ 198—33

HUGO O. SCHULZ, *Primary Examiner.*